United States Patent [19]

Park

[11] Patent Number: 5,990,803
[45] Date of Patent: Nov. 23, 1999

[54] MULTIFUNCTIONAL REMOTE CONTROLLER AND CONTROL METHOD FOR MULTIPLE APPLIANCES USING THE SAME

[75] Inventor: Woo-Kyeong Park, Seoul, Rep. of Korea

[73] Assignee: Samsung Electronics Co., Ltd., Kyungki-do, Rep. of Korea

[21] Appl. No.: 08/901,785

[22] Filed: Jul. 28, 1997

[30] Foreign Application Priority Data

Sep. 30, 1996 [KR] Rep. of Korea ............ 96-43121

[51] Int. Cl.⁶ ...................................... H04N 7/00
[52] U.S. Cl. .................. 340/825.34; 340/825.69; 340/825.72; 348/734; 348/7; 348/12; 380/23
[58] Field of Search ............ 340/825.34, 825.69, 340/825.72, 825.22; 348/734, 552, 7, 10, 12, 3, 1; 359/196; 380/23

[56] References Cited

U.S. PATENT DOCUMENTS 5,410,326  4/1995  Goldstein ............... 348/134
5,721,583  2/1998  Harada et al. ............ 348/12

*Primary Examiner*—William A. Cuchlinski, Jr.
*Assistant Examiner*—Yonel Beaulieu
*Attorney, Agent, or Firm*—Sughrue, Mion, Zinn, Macpeak & Seas, PLLC

[57] ABSTRACT

A remote controller having a multifunction and a control method for controlling multiple appliances using the remote controller are provided. The remote controller includes a menu selector for displaying predetermined menus on a screen according to a menu key and a selection key and inputting a command of selecting a menu, a controller for outputting data corresponding to the command input from the menu selector, and a data transmitter for transmitting the data of the controller in the form of optical signals of a predetermined frequency band.

5 Claims, 1 Drawing Sheet

MULTIFUNCTIONAL REMOTE CONTROLLER AND CONTROL METHOD FOR MULTIPLE APPLIANCES USING THE SAME

BACKGROUND OF THE INVENTION

The present invention relates to a remote controller, and more particularly, to a multifunctional remote controller and a method for controlling multiple appliances using the same.

A conventional remote controller controls a single appliance. For example, a remote controller for a television controls only the functions of the television, not those of other home appliances such as a telephone. Also, the large number of buttons of the remote controller makes it inconvenient to select a function of the home appliance.

SUMMARY OF THE INVENTION

It is an object of the present invention to provide a multifunctional remote controller for controlling multiple appliances.

It is another object of the present invention to provide a control method for controlling multiple appliances using the above remote controller.

To accomplish the above object of the present invention, there is provided a multifunctional remote controller including: a menu selector for displaying predetermined menus on a screen according to a menu key and a selection key and inputting a command of selecting a menu; a controller for outputting data corresponding to the command input from said menu selector; and a data transmitter for transmitting the data of said controller in the form of optical signals of a predetermined frequency band.

To accomplish another object of the present invention, there is provided a control method for controlling the multiple appliances comprising the steps of: displaying menus on a screen according to a predetermined key or mouse button; selecting a desired menu from menus displayed on the screen; and performing a mode operation corresponding to the selected menu.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
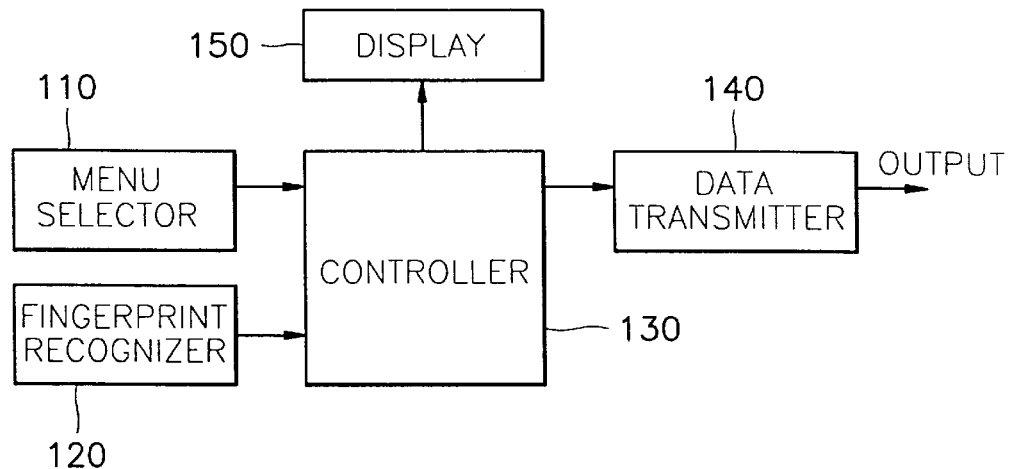
FIG. 1 is a block diagram showing a multifunctional remote controller according to the present invention.

Referring to FIG. 1, a remote controller according to the present invention includes a menu selector 110 for selecting a menu to be performed, a fingerprint recognizer 120 for recognizing a fingerprint so as to identify a user, a controller 130 for identifying an input order and an input fingerprint pattern to generate data corresponding thereto and generate data to display information on a remote controller panel, a data transmitter 140 for transmitting data via a radio signal, and a display 150 for displaying a character or an image corresponding to input data.

In the case that the remote controller according to the present invention is adapted to a television, for example, functions other than television functions may be controlled; for example, an Internet information service function or a telephone dialing function, as well as a basic operation of the television, can be performed.

An embodiment in which a television remote controller has a multifunction according to the present invention will be described as follows.

The menu selector 110 includes a key or a mouse button for controlling operations of the television performed by the remote controller as well as various other service functions.

The key of the menu selector 110 can be set by various methods. For example, a menu key and a selection key can be selected by a POP-UP display method.

According to the POP-UP display method, a menu is displayed on a screen by pressing the key or the mouse button and after an indicator is moved to a corresponding menu by the transmitter of the remote controller, an instruction to perform operations of the main menu and the sub-menus is input by using the selection key. At this time, the sub-menu can be converted to the main menu by operating the menu key. Accordingly, the menu to be performed can be selected by just two key strokes.

The fingerprint recognizer 120 reads characteristics of an input fingerprint in order to perform the selected menu only when an initially set fingerprint pattern is input, thus preventing unauthorized users from operating the remote.

The fingerprint recognizer 120 includes a pattern identifying chip and a ROM for storing the fingerprint pattern.

In the controller 130, information corresponding to a key of the menu selector 110 is input and then data corresponding thereto is output. That is, when the menu key is input, data for displaying the menu is output, and when the selection key is input, data for outputting an optical signal which can be recognized by a controller (not shown) of the television is output. At this time, only if the fingerprint pattern input to the fingerprint recognizer 120 is identical with an initially predetermined fingerprint pattern, data for performing the selected menu is output, and if not, the output of the selected menu data is prevented. Also, data representing the current time, telephone number and a state of the remote controller is output to the display 150.

In the data transmitter 140, a signal corresponding to the data input from the controller 130 is transmitted to the television by radio signal. The data can be transmitted by radio signal in various ways. The transmission signal in the present embodiment of the invention uses light of a predetermined frequency band to transmit data.

In the display 150, the data representing the current time, telephone number and a state of the remote controller is input to be displayed on a liquid crystal display in the form of a character or an image.

According to the above description, the remote controller of the present invention can perform the multifunction.

Figure 2:
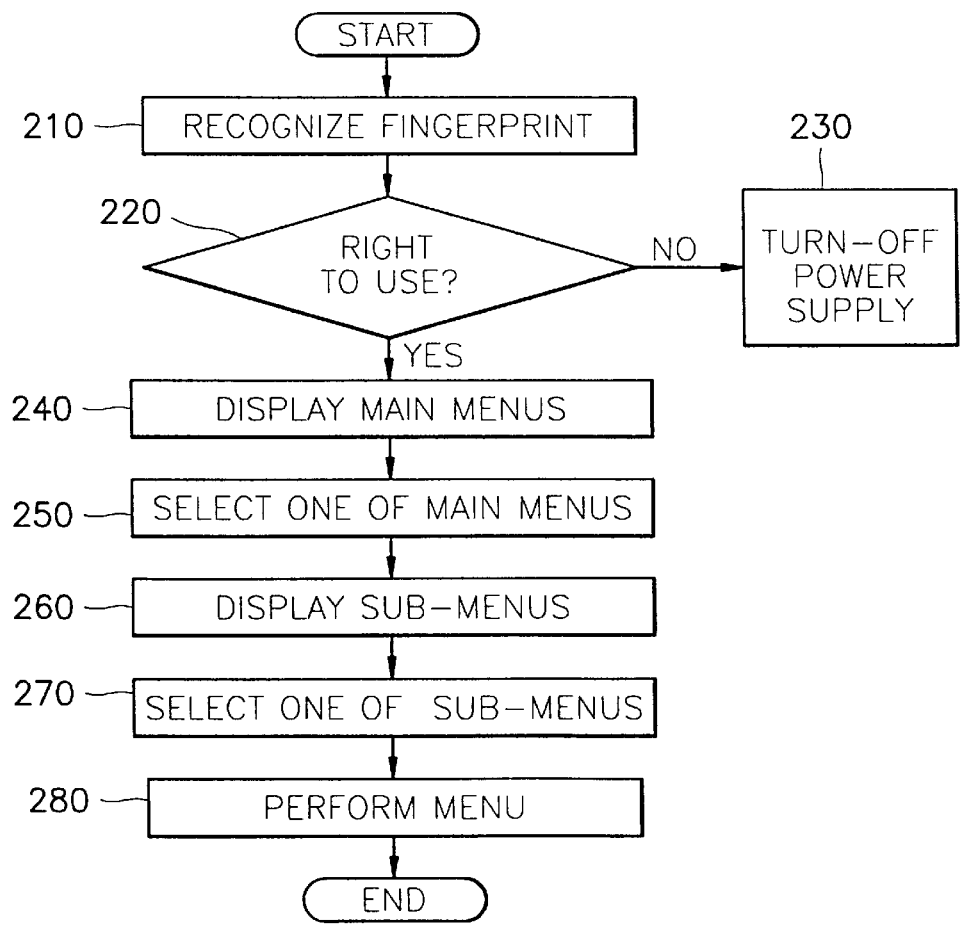
FIG. 2 is a flow chart of a control method for controlling multiple appliances using the remote controller according to the present invention.

Referring to FIG. 2, the control method for controlling multiple appliances using the remote controller according to the present invention includes the steps of: recognizing a fingerprint (step 210), determining a right of a user to use appliances (step 220), turning off a power supply if a user does not have a right to use appliances (step 230), displaying main menus on a screen (step 240), selecting one of the main menus displayed on the screen (step 250), displaying sub-menus of the selected main menu on the screen (step 260), selecting one of the sub-menus displayed on the screen (step 270) and performing a function corresponding to data of the selected sub-menu (step 280).

In step 210 of recognizing a fingerprint, a pattern of the input fingerprint is recognized and stored as data in a memory.

In step 220 of determining right of a user to use appliances, it is determined whether data of the input fingerprint pattern is identical with the initially input fingerprint pattern stored in the EPROM.

At this time, if it is determined that the data of the input fingerprint pattern is different from the initially input fingerprint pattern stored in the EPROM, the power supply is turned off in step 230. However, when it is determined that the data of the input fingerprint pattern is identical to the initially input fingerprint pattern stored in the EPROM, the subsequent steps are processed since the input fingerprint is approved to use appliances.

In step 240 of displaying a main menu, the top menu is displayed on a screen in the case that a menu key of the remote controller is input. At this time, the main menu includes a basic menu for operating a television, an Internet service menu for receiving Internet information and a telephone service menu for dialing through the remote controller.

In step 250 of selecting a main menu, an indicator is located at a desired menu displayed on the screen by moving the transmitter of the remote controller and then pressing the selection key, to thereby select the desired menu.

In step 260 of displaying a sub-menu, sub-menus for the main menu selected in step 250 are displayed on the screen.

In step 270 of selecting a sub-menu, the indicator is moved by moving the transmitter of the remote controller, to thereby select a desired item from the sub-menus displayed on the screen.

In step 280 of performing a menu, in the case that input of additional data is required, the additional data is input and then an operation corresponding to the input data is performed; and in the case that only selection of the sub-menu is required, operation of the selected sub-menu function is performed.

For example, in the case that the selected main menu is a telephone service menu, a dialing menu is selected from the sub-menus and then a telephone number is input, to thereby perform a telephone dialing operation.

However, in the case that the selected menu is a sub-menu such as a menu of a channel up/down operation, only the sub-menu is selected, to thereby perform the operation of the selected menu item.

It is obvious for a person skilled in the art that the present invention can be applied to other electronic apparatuses without being limited to the illustrated embodiment in which a remote controller adapted to a television is described.

As described above, according to the remote controller of the present invention, a selection method of the key is simplified, to thereby easily provide various kinds of home service.

What is claimed is:

1. A multifunctional remote controller comprising:
  a menu selector for displaying predetermined menus on a screen according to a menu key and a selection key and inputting a command for selecting a menu, wherein one of the predetermined menus is a main menu for selecting from a plurality of different appliances;
  a controller for outputting data corresponding to the command input from said menu selector;
  a data transmitter for transmitting the data output by said controller as optical signals of a predetermined frequency band; and
  a fingerprint recognizer for determining whether or not an input fingerprint matches a predetermined fingerprint and for applying a signal to said controller indicating whether or not the input fingerprint matches the predetermined fingerprint, and wherein said controller outputs the data corresponding to the command input from said menu selector only when the signal applied to said controller indicates that the input fingerprint matches the predetermined fingerprint.

2. A multifunctional remote controller, comprising:
  a menu selector for displaying predetermined menus on a screen according to a menu key and a selection key and inputting a command for selecting a menu;
  a controller for outputting data corresponding to the command input from said menu selector; and
  a data transmitter for transmitting the data output by said controller as optical signals of a predetermined frequency band, wherein the menu selected by said menu selector is selected according to a POP-UP display method.

3. A control method comprising the steps of:
  providing a remote controller;
  using said remote controller to display menus on a screen in accordance with activation of a predetermined key or mouse button of said remote controller;
  selecting a desired menu from the menus displayed on the screen; and
  performing a mode operation corresponding to said selected menu;
  wherein one of the menus displayed on the screen includes an Internet service menu for receiving an Internet information service.

4. A control method comprising the steps of:
  providing a remote controller;
  using said remote controller to display menus on a screen in accordance with activation of a predetermined key or mouse button of said remote controller;
  selecting a desired menu from the menus displayed on the screen;
  identifying a right of a user to use appliances before said step of displaying a menu; and
  performing a mode operation corresponding to said selected menu, wherein in said step of displaying a menu, a menu for a necessary function is displayed on the screen by a POP-UP window method and, wherein in said step of identifying right of a user to use appliances, a fingerprint of the user is recognized to identify the right of the user to use the appliances.

5. A control method comprising the steps of:
  providing a remote controller;
  using said remote controller to display menus on a screen in accordance with activation of a predetermined key or mouse button of said remote controller;
  selecting a desired menu from the menus displayed on the screen; and
  performing a mode operation corresponding to said selected menu, wherein in said step of selecting a menu, one of the menus displayed on the screen is selected by moving a transmitter of said remote controller.

* * * * *